(12) United States Patent
Yoshino et al.

(10) Patent No.: US 10,543,763 B2
(45) Date of Patent: Jan. 28, 2020

(54) CLIP

(71) Applicant: YKK Corporation, Tokyo (JP)

(72) Inventors: Tetsuya Yoshino, Novi, MI (US); Shinsuke Saiga, Seoul (KR)

(73) Assignee: YKK Corporation (JP)

( * ) Notice: Subject to any disclaimer, the term of this patent is extended or adjusted under 35 U.S.C. 154(b) by 0 days.

(21) Appl. No.: 15/955,961

(22) Filed: Apr. 18, 2018

(65) Prior Publication Data

US 2018/0304782 A1 Oct. 25, 2018

Related U.S. Application Data

(60) Provisional application No. 62/489,112, filed on Apr. 24, 2017.

(51) Int. Cl.
*A47C 31/02* (2006.01)
*B60N 2/58* (2006.01)

(52) U.S. Cl.
CPC .......... *B60N 2/5825* (2013.01); *A47C 31/023* (2013.01); *Y10T 24/44017* (2015.01)

(58) Field of Classification Search
CPC ............... Y10T 24/309; Y10T 24/3449; Y10T 24/3485; Y10T 24/44017; B68G 7/12; A47C 31/023; B60N 2/5825
See application file for complete search history.

(56) References Cited

U.S. PATENT DOCUMENTS

| | | | | |
|---|---|---|---|---|
| 6,048,025 A * | 4/2000 | Tillner | .................. | A47C 31/023 24/601.2 |
| 6,560,827 B1 * | 5/2003 | Gross | ..................... | A47C 17/84 24/265 C |
| 2007/0257531 A1 | 11/2007 | Mashimo | | |
| 2008/0258523 A1 * | 10/2008 | Santin | .................. | B60N 2/5825 297/218.2 |
| 2009/0064471 A1 * | 3/2009 | Santin | .................. | A47C 31/023 24/581.11 |
| 2009/0140569 A1 * | 6/2009 | Mashimo | ............. | B60N 2/5825 297/452.59 |
| 2012/0284974 A1 * | 11/2012 | Yamamoto | ........... | A47C 31/023 24/458 |
| 2014/0352117 A1 * | 12/2014 | Murasaki | ............. | A47C 31/023 24/581.11 |
| 2015/0033516 A1 * | 2/2015 | Saiga | ................... | B60N 2/5825 24/594.1 |

(Continued)

FOREIGN PATENT DOCUMENTS

| | | |
|---|---|---|
| JP | 2006095093 | 4/2006 |
| JP | 2007275557 | 10/2007 |

(Continued)

OTHER PUBLICATIONS

YKK Corporation; Office Action for Japanese application No. 2018-042070 filed Mar. 8, 2018, dated Mar. 5, 2019, 10 pgs.

*Primary Examiner* — Robert Sandy
*Assistant Examiner* — Michael S Lee
(74) *Attorney, Agent, or Firm* — Taylor English Duma LLP

(57) ABSTRACT

A clip for attaching a seat cover to a seat cushion includes a locking part configured to be secured to the seat cover and a hook connected to the locking part and configured to be secured to a wire of the seat cushion. The hook defines a wire holding cavity.

9 Claims, 18 Drawing Sheets

(56) References Cited

U.S. PATENT DOCUMENTS

| | | | | |
|---|---|---|---|---|
| 2016/0167554 A1* | 6/2016 | Murasaki | ............. | B60N 2/5825 |
| | | | | 297/452.61 |
| 2016/0174719 A1* | 6/2016 | Saiga | .................. | A47C 31/023 |
| | | | | 24/531 |
| 2016/0249746 A1* | 9/2016 | Saiga | .................. | A47C 31/023 |
| | | | | 24/545 |
| 2016/0264030 A1 | 9/2016 | Saiga et al. | | |
| 2017/0129766 A1* | 5/2017 | Fukuzawa | ............. | B68G 15/00 |
| 2018/0162719 A1 | 6/2018 | Matsumura et al. | | |
| 2018/0229634 A1* | 8/2018 | Baisch | .................. | A47C 31/02 |

FOREIGN PATENT DOCUMENTS

| | | |
|---|---|---|
| JP | 3205190 | 7/2016 |
| JP | 6020320 | 11/2016 |
| WO | 2015063944 | 5/2015 |
| WO | 2016178275 | 11/2016 |

* cited by examiner

CLIP

REFERENCE TO RELATED APPLICATIONS

This application claims the benefit of U.S. Provisional Application No. 62/489,112, filed Apr. 24, 2017, which is hereby specifically incorporated by reference herein in its entirety.

TECHNICAL FIELD

Field of Use

This disclosure relates to fastening clips, of which cover fastening clips are a variety. More specifically, this disclosure relates to upholstery clips configured to snap onto a wire disposed inside a vehicle seat cushion pad.

Related Art

A chair or a vehicle seat can comprise a cushion or a soft pad and can define a surface that can be covered by a seat cover. The seat cover can cover a surface of the cushion or soft pad or on a back rest of the chair or vehicle seat, or both. To secure the cover to the seat, a variety of structures and methods have been adopted that maintain the aesthetic design of the seat. One such structure can comprise a wire disposed in a groove of the cushion and clips that are arranged at an edge of the cover and are engaged to the wire to fasten the cover to the seat. The clips can be loaded from above through the cover from a variety of directions in ways that can potentially dislodge the clips from the wire.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a clip for attaching a seat cover to a seat cushion, the clip comprising: a locking part configured to be secured to the seat cover; and a hook connected to the locking part and configured to be secured to a wire of the seat cushion, wherein the hook defines a wire holding cavity.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
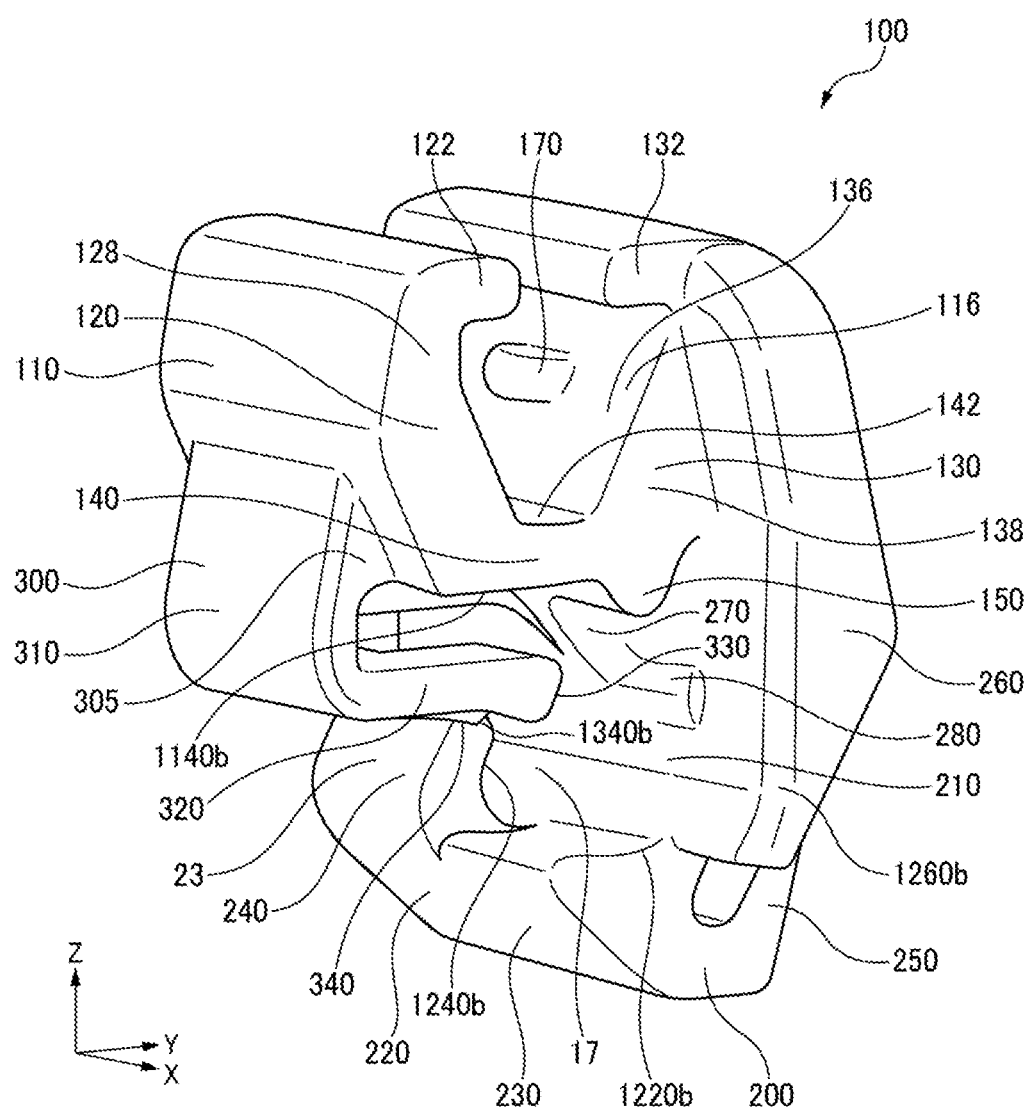
FIG. 1 is a right front perspective view of a cover fastening clip in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

In one aspect, a cover fastening clip and associated methods, systems, devices, and various apparatuses are disclosed herein. In one aspect, the cover fastening clip can comprise a locking claw and a hook.

A cover fastening clip 100 is described below on the basis of a coordinate axis of X-Y-Z directions shown in FIGS. 1-10. An X-axis direction can be referred to as a left-right or horizontal direction. For example, the X-axis direction coincides with an extension direction of a wire 36 (shown in FIG. 10) disposed in a groove 34 (shown in FIG. 10) of a cushion 30 (shown in FIG. 10) or with the extension direction of the wire when disposed inside a wire holding cavity of a clip disclosed herein, which direction is also represented by a transverse axis 117 (shown in FIG. 3). The X-axis direction can further coincide with an extension direction of an edge of a cover 32 (which will be described later and is also shown in FIG. 10). Also, the X-axis direction can coincide with an extension direction of an edge of a locking end member 42 (shown in FIG. 10).

An upper-lower direction is a Z-axis direction orthogonal to the X-axis direction and to a Y-axis direction and typically coincides with a depth direction of the cushion 30. For example, a direction along which the locking end member 42 can be inserted into the groove 34 of the cushion 30 and locked to the wire 36 can be referred to as the Z-axis direction. Also, the upper-lower direction coincides with a direction perpendicular to a surface of the cover 32 stretched on the cushion 30.

The Y-axis direction is orthogonal to the X-axis direction (left-right direction) and the Z-axis direction (upper-lower direction) and can also be referred to as a front-rear direction. A surface of a structural element that is parallel with the front-rear direction can be referred to as a lateral side.

Figure 2:
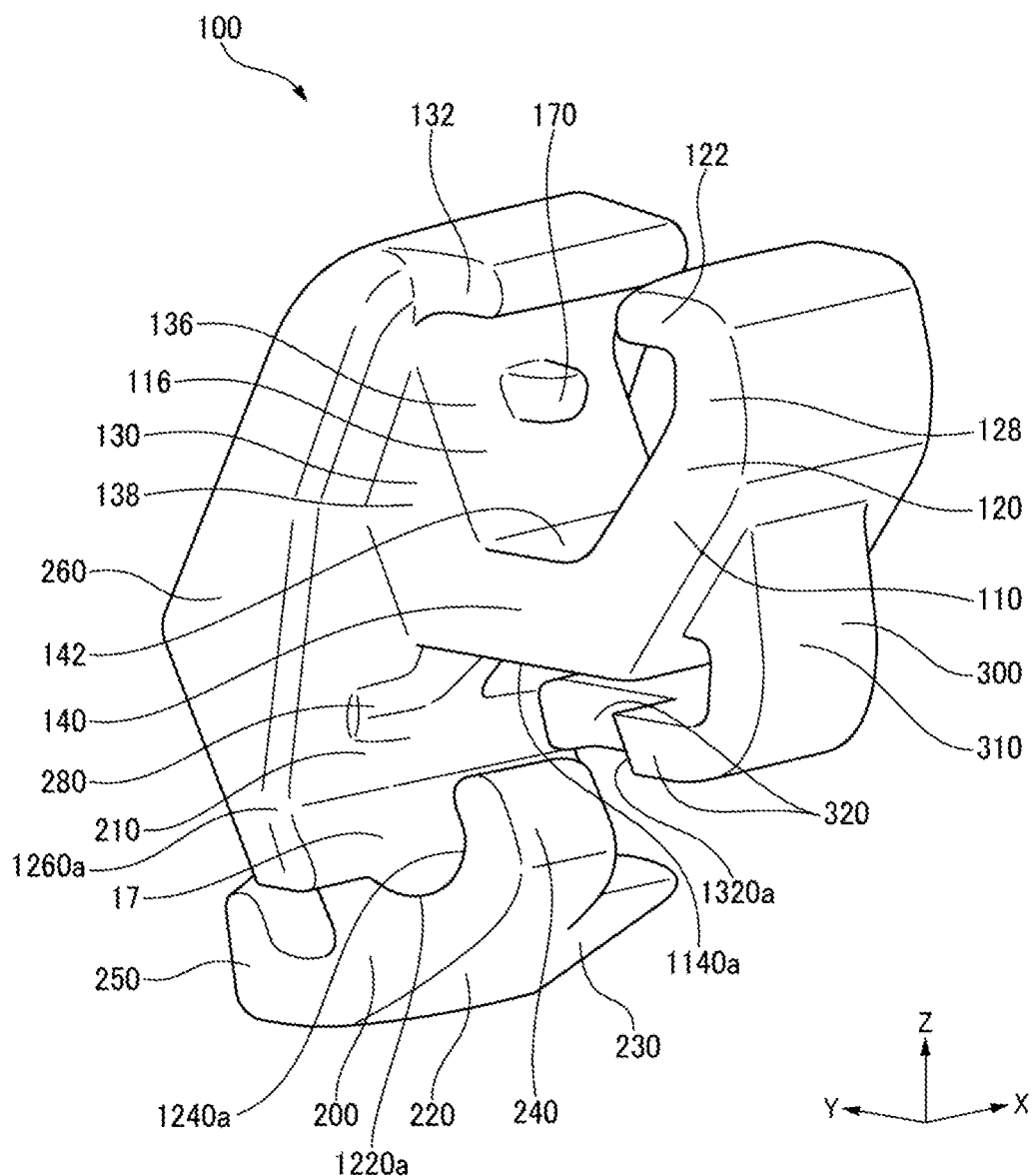
FIG. 2 is a left front perspective view of the cover fastening clip of FIG. 1.
Figure 3:
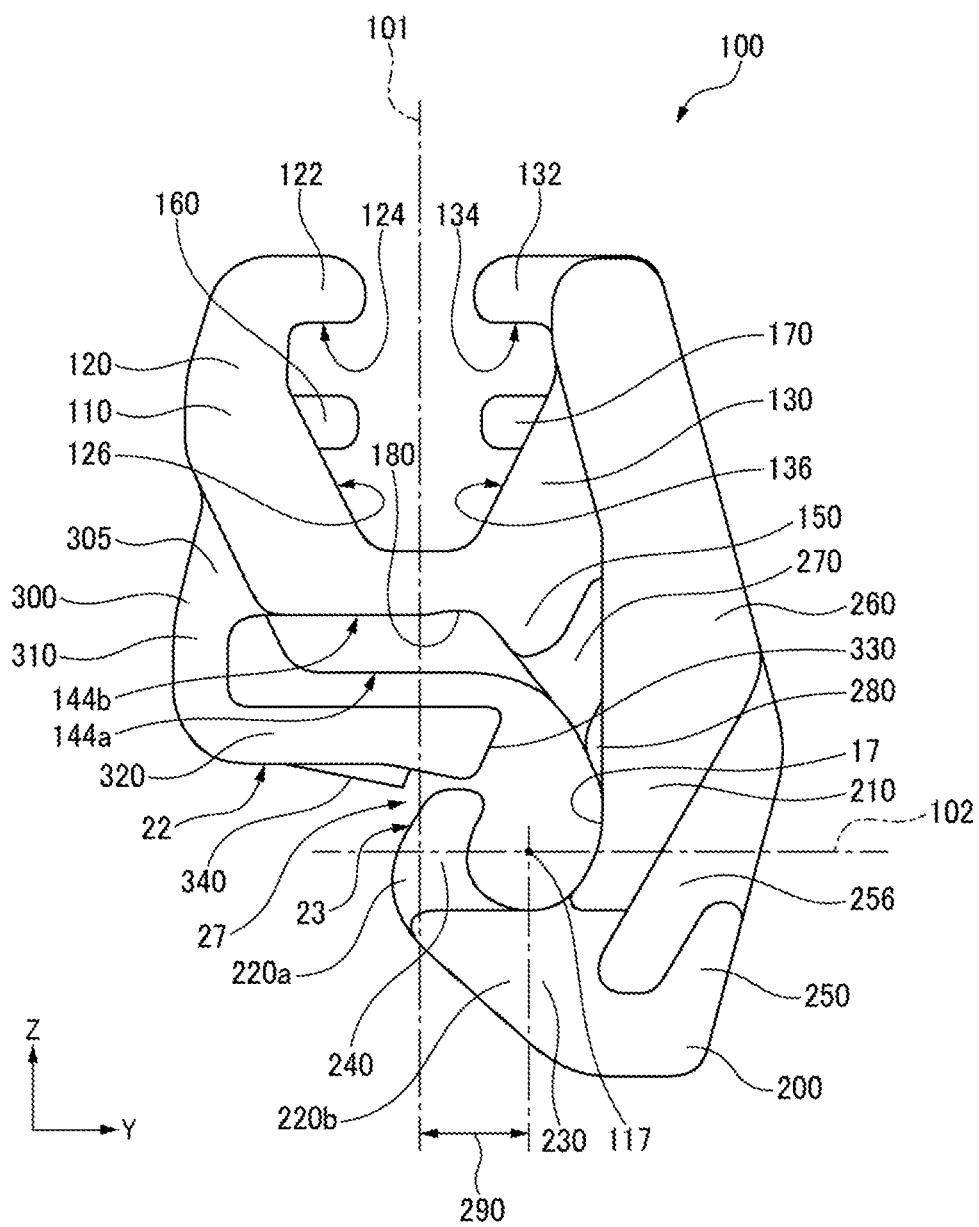
FIG. 3 is a right side elevation view of the cover fastening clip of FIG. 1.

FIGS. 1-8 show a cover fastening clip 100. As shown in FIGS. 1 and 2, the cover fastening clip 100 can comprise a locking part 110. The locking part 110 can comprise a locking claw base part 140 and a pair of locking claws 120,130. The locking claws 120,130 can comprise arms 128,138 formed to face each other. Base end portions (which are also base end portions of the locking claws 120,130) of the arms 128,138 can be integrally formed from both sides of an upper surface 142 of the locking claw base part 140. The locking claw base part 140 can further comprise lower surfaces 144a, 144b (shown in FIG. 3), which can face an opposite direction from the upper surface 142 as shown. The lower surfaces 144a, 144b can be offset from one another as shown in FIG. 3. The cover fastening clip 100 can be integrally molded with a synthetic resin.

The locking claws 120,130 can protrude upwards from and can be angled with respect to the upper surface 142 and can be formed so that a gap formed between in the front-rear direction (i.e., in the Y-axis direction) becomes greater as the distance from the upper surface 142 in a positive Z-axis direction increases. Leading end portions 122,132 of the locking claws 120,130 can be respectively bent inwards, i.e., in a direction in which they face each other and extend towards each other and toward a locking groove vertical axis or first centerline axis 101 (shown in FIG. 3). Each of the leading end portions 122,132 can comprise a locking surface 124,134 (shown in FIG. 3) facing the locking claw base part 140 and can be configured to be locked to the locking end member 42 (shown in FIG. 10). Each of the locking surfaces 124,134 can be formed to be substantially parallel with the upper surface 142 of the locking claw base part 140. As will be described in more detail below, the locking end member 42 can be engaged by the pair of locking claws 120,130 and the locking claw base part 140.

The arms 128,138 of the locking claws 120,130 of the cover fastening clip 100 can further comprise inner surfaces 126,136 (the inner surface 126 is shown in FIG. 3), which can face each other and from which a pair of locking tabs 160,170 (the locking tab 160 is shown in FIG. 3) can extend. The locking tabs 160,170 can be projections extending from the respective inner surfaces 126,136 of the locking claws 120,130 of the cover fastening clip 100 and can be centered along the first centerline axis 101 (shown in FIG. 3) of the cover fastening clip 100. The locking tabs 160,170 can be sized to fit within locking grooves 44 (shown in FIG. 10) of the locking end member 42 (shown in FIG. 10). The inner surfaces 126,136 can define a locking groove 116, which can be sized to receive the locking end member 42. The cover fastening clip 100 can further comprise a first protrusion 150, which can extend downward from the locking claw base part 140, the locking claw 130, or both.

The cover fastening clip 100 can further comprise a hook 200 extending from the locking part 110 below the lower surfaces 144*a*, 144*b*. In one aspect, as shown, an intersection of the hook 200 and the locking claw 130 can extend from a lower end of the locking claw 130 adjacent to the lower surfaces 144*a*, 144*b* to an upper end of the locking claw 130 adjacent to the leading end portion 132. In another aspect, the hook 200 can extend from another portion of the cover fastening clip 100 such as, for example and without limitation, the lower surfaces 144*a*, 144*b*. The hook 200 can comprise an extension portion 210 extending downwards and away and a forward hook 220 bent frontwards from a lower end of the extension portion 210 distal from the locking part 110. The forward hook 220 can be inclined towards the locking part 110. The forward hook 220 can be upwardly inclined towards the locking claw base part 140 and can define an inclined surface. The extension portion 210 and the forward hook 220 can define a wire holding cavity 17, which can be a U-shaped groove sized to receive the wire 36 (shown in FIG. 4).

The forward hook 220 can comprise a base 230 and a claw 240 extending from the base 230. The claw 240 can define a guide surface 23 angled with respect to a frontward-facing and downward-facing surface of the base 230 and angled with respect to a second leg 320 of a guide 300, which is discussed below. The frontward-facing and upward-facing guide surface 23 of the claw 240 can be configured to facilitate entry of the wire 36 into the wire holding cavity 17 (shown in FIG. 4). Additionally, the forward hook 220 can comprise a reverse hook 250 extending rearwards as shown.

The cover fastening clip 100 can further comprise a shoulder 260 extending left to right across a rear side of the cover fastening clip 100 and at least partly defining the rear side. As shown, the shoulder 260 can extend from both the left and right sides or ends of the cover fastening clip 100. More specifically, the shoulder 260 can extend from the locking part 110, the hook 200, or both as shown. In one aspect, as shown, the shoulder 260 can extend from the uppermost surface of the cover fastening clip 100 to a bottommost surface of the wire holding cavity 17. In another aspect, the shoulder 260 can extend to a bottommost surface of the cover fastening clip 100 or can stop short of the uppermost surface of the cover fastening clip 100. The dimension of the shoulder 260 in the left-right direction is greater than the dimension of the wire holding cavity 17 of the hook 200 in the left-right direction. The shoulder 260 can be formed at the position of the wire holding cavity 17 of the hook 200. The cover fastening clip 100 can comprise a gusset 270 extending between the locking claw base part 140 and the extension portion 210 of the hook 200. The cover fastening clip 100 can comprise a second protrusion 280 extending from the extension portion 210 of the hook 200 or from the shoulder 260. The shoulder 260, the gusset 270, and the second protrusion 280 can all be configured so as not to interfere with the wire 36 in its intended orientation with respect to the cover fastening clip 100.

The cover fastening clip 100 can further comprise the guide 300. The guide 300 can extend from a portion of the locking part 110 such as the locking claw 120. The guide 300 can comprise a first leg 310 extending in a substantially vertical or Z-axis direction from the locking claw 120 and the second leg 320 extending from the first leg 310. The first leg 310 can be connected to the locking part 110 with a connecting portion 305, which can be angled from the Z-axis direction and can comprise fillets where the connecting portion 305 intersects the locking part 110. An inside edge and an outside edge of an intersection between the connecting portion 305 and the first leg 310 can be radiussed to facilitate bending of the first leg 310 with respect to the connecting portion 305 or the locking part 110. Likewise, an inside edge and an outside edge of an intersection between the first leg 310 and the second leg 320 can be radiussed to facilitate bending of the second leg 320 with respect to the first leg 310, the connecting portion 305, or the locking part 110. The second leg 320 can comprise a tip 330 at an end distal from the first leg 310 and a ramp 340 on a lower surface of the second leg 320. A gap between the second leg 320 of the guide 300 and the forward hook 220 of the hook 200 can become a wire insertion opening 27 (shown in FIG. 3) in which the wire 36 can be inserted.

As shown in FIG. 2, some of the features present on a left side 100*a* (shown in FIG. 5) of the cover fastening clip 100 can be similar if not identical to the corresponding features present on a right side 100*b* (also shown in FIG. 5) of the cover fastening clip 100. For example, the shoulder 260 and the locking claws 120,130 are similar if not identical in certain views on each side 100*a*, 100*b* of the cover fastening clip 100. As will be described below, however, the left side 100*a* can be completely missing some features or have significantly altered some features from those incorporated into the right side 100*b*. For example and without limitation, the locking claw base part 140 can define a different thickness from the upper surface 142 to each of the lower surfaces 144*a*, 144*b*. Also, the second leg 320 of the guide 300 can extend further on the right side 100*b*. Additionally, other differences can be found in the shoulder 260 (e.g., a relief 265 shown in FIG. 6) and in the locking claws 120,130 (e.g., a taper 700 defining a taper angle 705 as both are shown in FIG. 7). Finally, the claw 240 can be present on only the left side 100*a*.

As will be described in more detail herein, various surfaces and/or edges of the cover fastening clip 100 can be used to limit or prevent rotation or other movement of the wire 36 inside or from the wire holding cavity 17. For example and without limitation, the locking claw base part 140 can define edges 1140*a*, 1140*b* of the lower surfaces 144*a*, 144*b*, respectively. Likewise, the shoulders 260*a*, 260*b* can define edges 1260*a*, 1260*b*, respectively; the forward hooks 220*a*, 220*b* can define edges 1220*a*, 1220*b*, respectively; the left second leg 320*a* can define an edge 1320*a*; the ramp 340 can define an edge 1340*b* (shown in FIG. 1); and the claw 240 can define edges 1240*a*, 1240*b*. Not all such edges are or can be specifically identified because of the infinite number of positions and orientations of the wire 36 inside the cover fastening clip 100 and the complex shape of the cover fastening clip 100.

Figure 4:
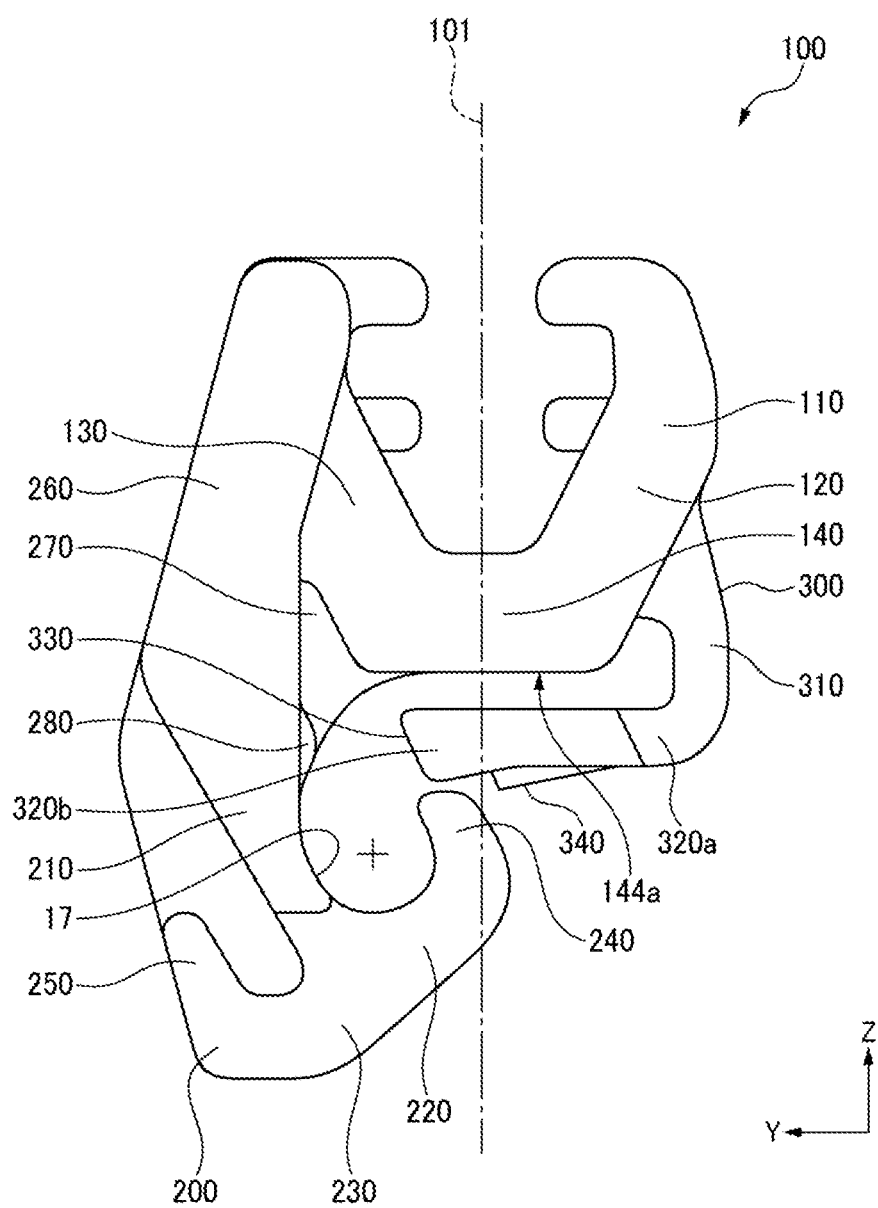
FIG. 4 is a left side elevation view of the cover fastening clip of FIG. 1.

As shown in FIGS. 3 and 4, a center of a lower portion of the wire holding cavity 17 can be offset rearward (toward the extension portion 210) from the first centerline axis 101 of the locking part 110 by an offset distance 290. The shoulder 260, the gusset 270, the first protrusion 150, and the second protrusion 280 can define a smooth radially innermost surface of the wire holding cavity 17 when viewing the right side 100*b* or the left side 100*a* of the cover fastening clip 100 from the side. The forward hook 220 can comprise a forward hook 220*b* on the right side 100*b* comprising the base 230 and a forward hook 220*a* on the left side 100*a* comprising both the base 230 and the claw 240. As shown, a rib 256 can extend between the reverse hook 250 and the shoulder 260 to facilitate, for example, the use of a tool (not shown) for removal of the cover fastening clip 100 from the wire 36 when the seat cover needs to be removed for a repair. The locking claw base part 140 and the first protrusion 150 can define a recess 180, which can be sized to allow additional rotation of the tip 330 of the second leg 320 of the guide 300. The ramp 340 of the second leg 320 can comprise a lower surface that is angled from the front-rear or Y-axis direction and a rear surface that is angled from the vertical or Z-axis direction. Likewise, the tip 330 can comprise a rear surface that is angled from the vertical direction.

The wire insertion opening 27 can be made smaller than a diameter D (shown in FIG. 17) of the wire 36 when the cover fastening clip 100 is in its natural unbent condition. The guide 300—and specifically a lower surface of the second leg 320 of the guide 300—can comprise a guide surface 22 extending towards the hook 200. The forward hook 220 of the hook 200 can define a guide surface 23 extending towards the guide 300. The hook 200 and the guide 300 can be formed so that the guide surfaces 22, 23 define a decreasing gap that ends with the wire insertion opening 27. An entrance passageway having a triangular shape can thus be formed. When inserting the wire 36, it is possible thereby to smoothly guide the wire 36 into the wire holding cavity 17. At the same time, as will described based on the configuration of the cover fastening clip 100, it is possible to keep the wire 36 from popping out of the wire holding cavity 17 unintentionally. For example, the gap between the tip 330 of the guide 300 and the extension portion 210 of the hook 200 can be made smaller than the diameter D of the wire 36 to further restrict movement of the wire 36. As shown, the second leg 320 has a second leg 320*a* on the left side 100*a* and a second leg 320*b* on the right side 100*b*. The second leg 320*b* on the right side 100*b* of the cover fastening clip 100 can extend to the tip 330 and comprise the ramp 340 while the second leg 320*a* on the left side 100*a* of the cover fastening clip 100 can stop short such that the second leg 320*a* does not cover the forward hook 220*a* directly above the forward hook 220*a*. In this way, the second leg 320*a* can be made not to interfere with the lower surface 144*b* of the locking claw base part 140.

Figure 5:
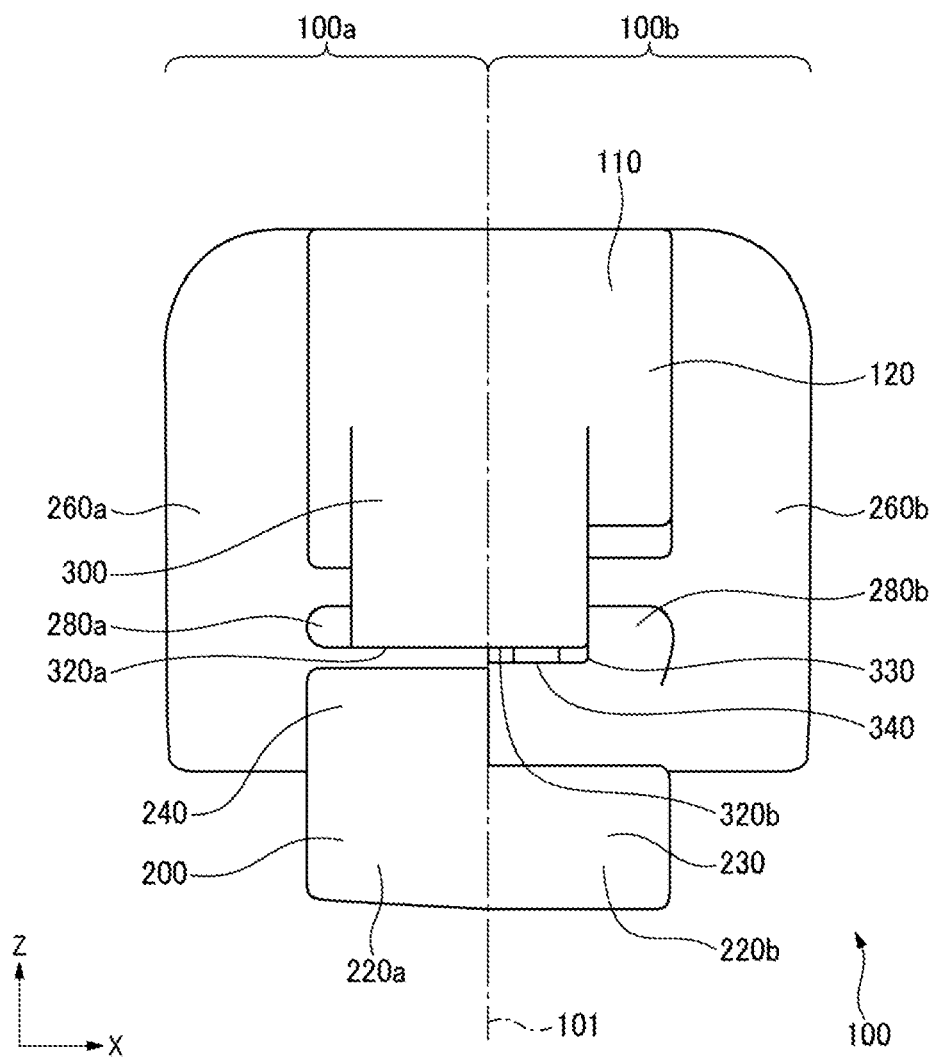
FIG. 5 is a front view of the cover fastening clip of FIG. 1.
Figure 6:
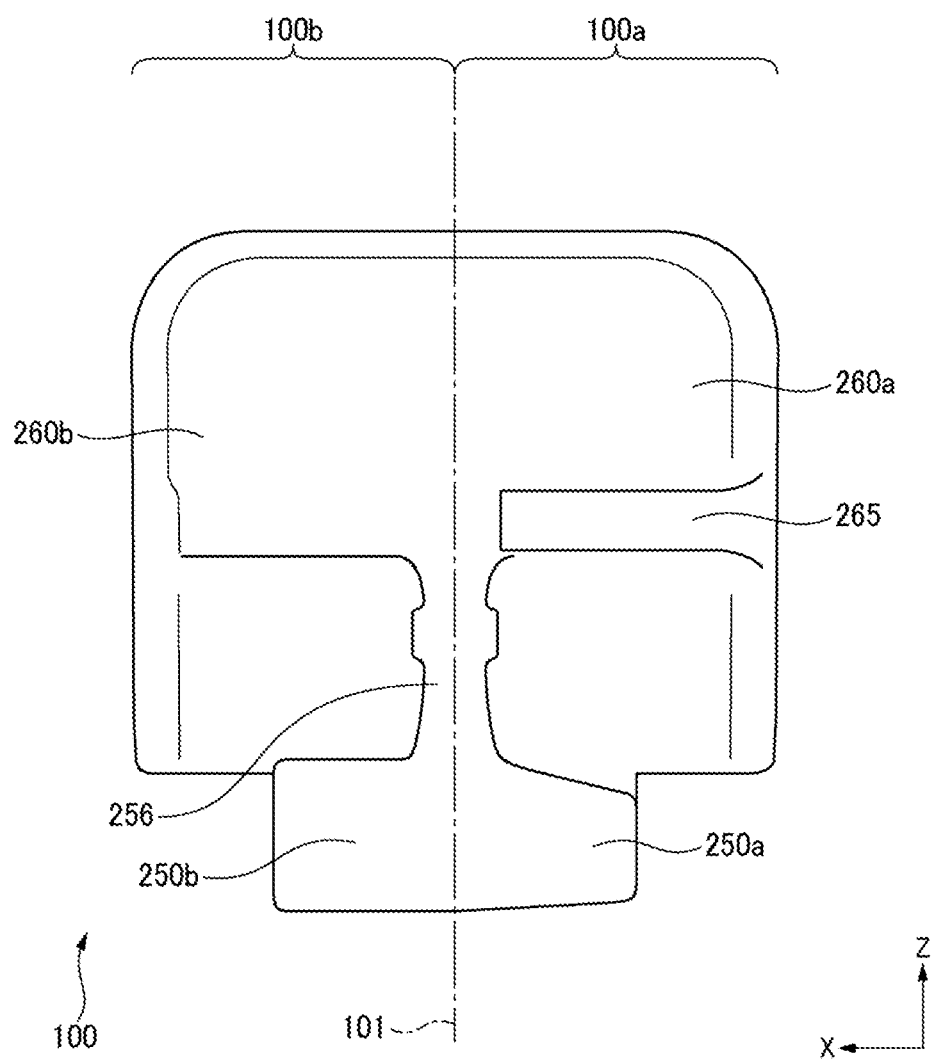
FIG. 6 is a rear view of the cover fastening clip of FIG. 1.
Figure 7:
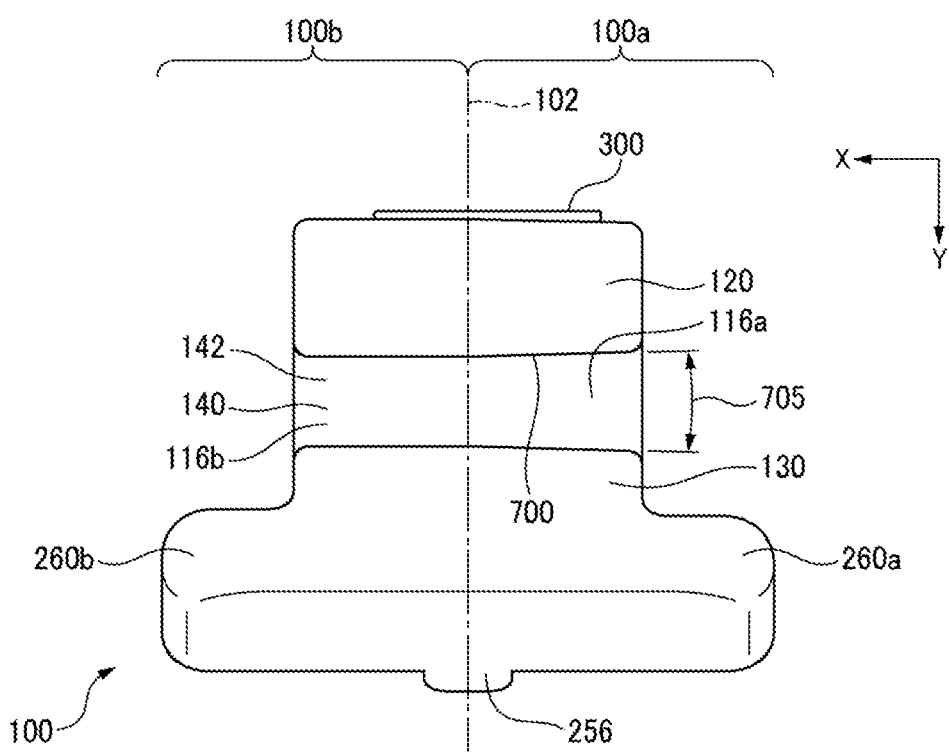
FIG. 7 is a top plan view of the cover fastening clip of FIG. 1.
Figure 8:
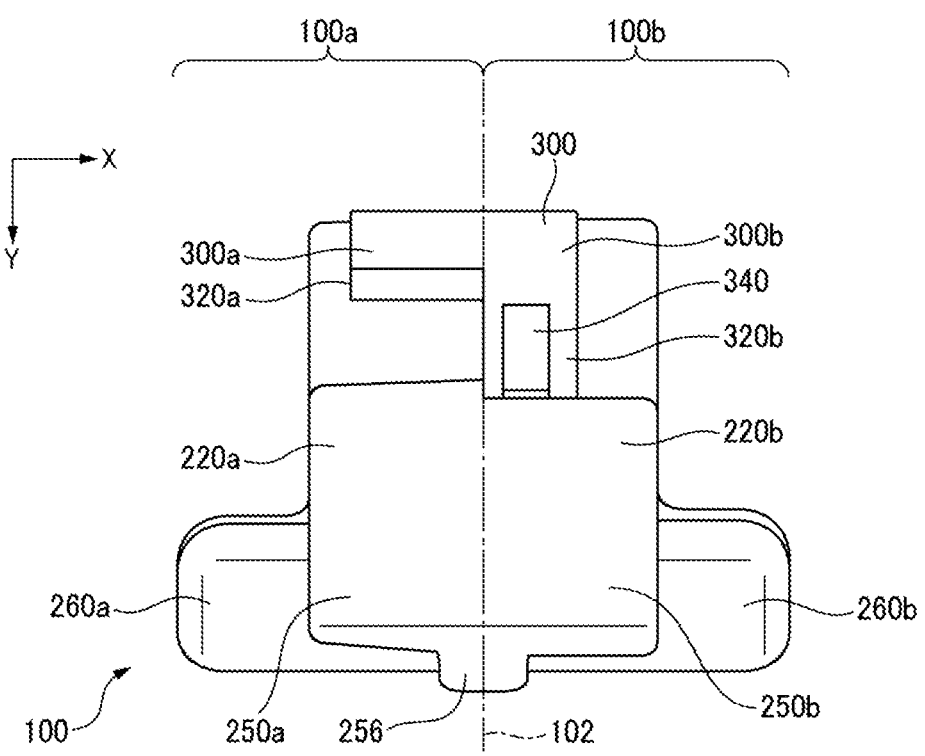
FIG. 8 is a bottom plan view of the cover fastening clip of FIG. 1.

FIGS. 5-8 show front, rear, top, and bottom views of the cover fastening clip 100, respectively, each figure showing the left side 100*a* and the right side 100*b* of the cover fastening clip 100 as divided along the first centerline axis 101 (with respect to FIGS. 5 and 6) or as divided along a second centerline axis 102 (with respect to FIGS. 7 and 8). In one aspect, as shown in FIG. 5, the claw 240 can be positioned only on the left side 100*a* (i.e., not on the right side 100*b*), and the tip 330 and the ramp 340 can be positioned only on the right side 100*b* (i.e., not on the left side 100*a*). To facilitate assembly to and prevent unintended removal of the wire 36, other differences can be incorporated into other features, as reflected in differences apparent between the forward hooks 220*a*, 220*b*, the second protrusions 280*a*, 280*b*, the shoulders 260*a*, 260*b* (as shown in FIGS. 5 and 6), and the reverse hooks 250*a*, 250*b* (shown in FIG. 6). Additional differences are apparent in the locking grooves 116*a*, 116*b* in FIG. 7 and in the reverse hook 250*a*, 250*b* in FIG. 8. Also shown in FIGS. 5 and 8 is a slight offset of the guide 300 towards the left side 100*a*.

Figure 9:
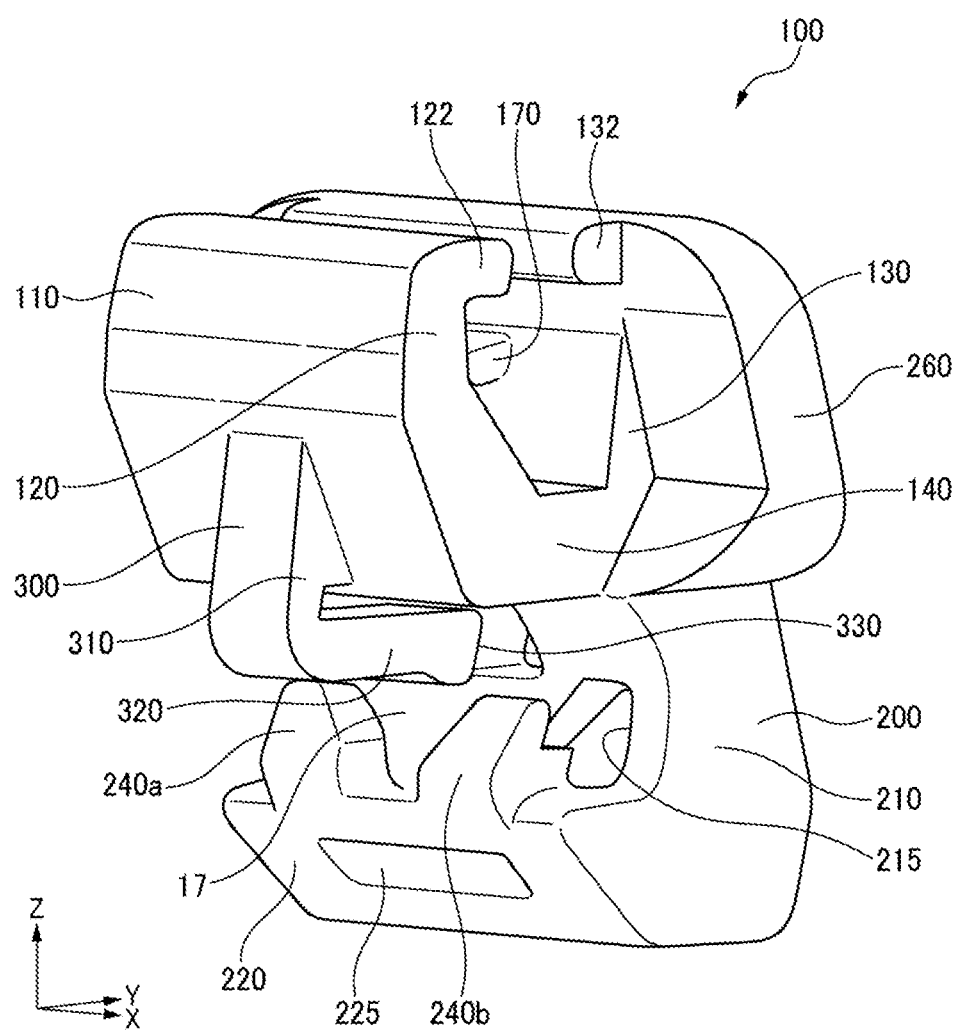
FIG. 9 is a right front perspective view of a cover fastening clip in accordance with another aspect of the current disclosure.
Figure 10:
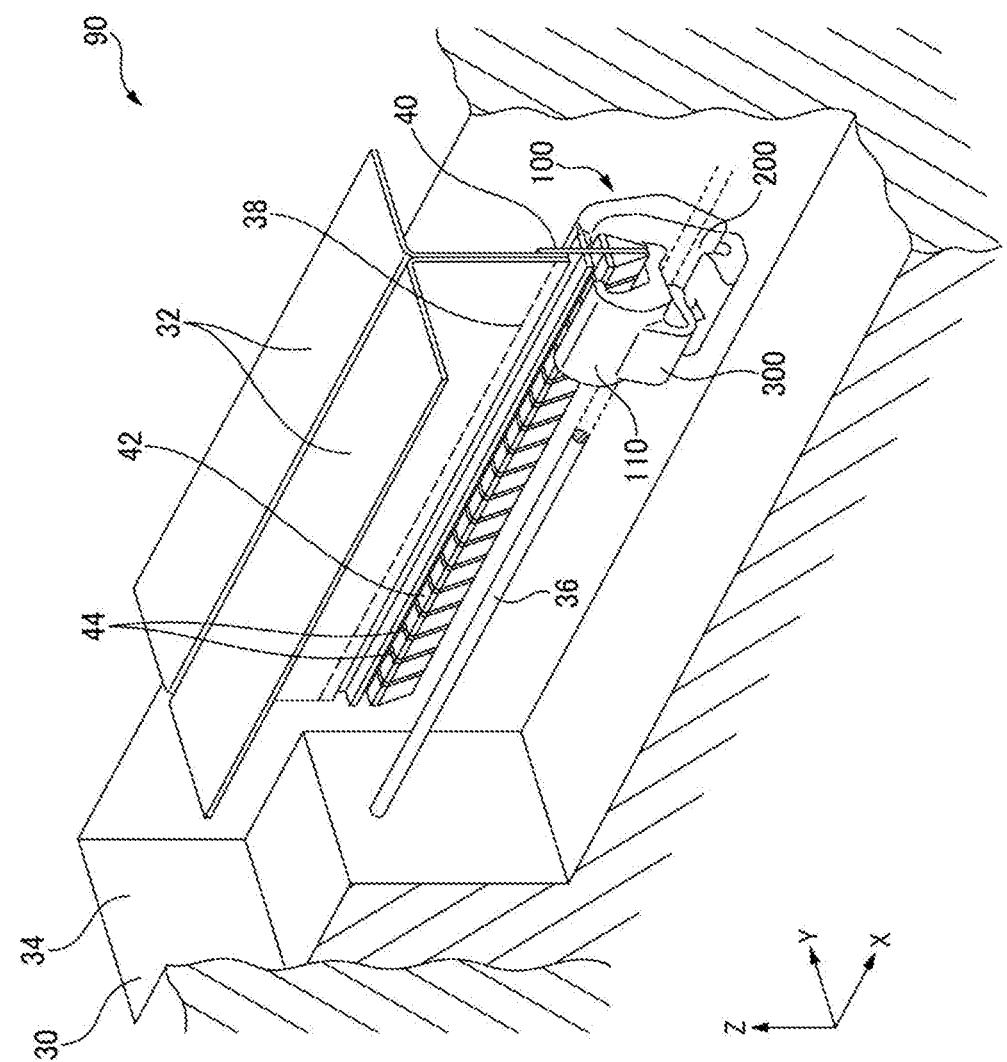
FIG. 10 is a perspective view of a cover fastening system showing the cover fastening clip of FIG. 1.

As shown in FIG. 9, the cover fastening clip 100 can comprise previously disclosed features such as the locking part 110, the hook 200, and the guide 300 but any of these and other features of the cover fastening clip 100 can have a modified shape as desired. As shown, the forward hook 220 can comprise a pair of claws 240*a*, 240*b*, one on each side of the forward hook 200, and the second leg 320 of the guide 300 can extend between the pair of claws 240*a*, 240*b* relative to the horizontal or X-axis direction. Each of the pair of claws 240*a*, 240*b* can resemble a tooth configured to maintain the position of the wire 36 once inserted into the wire holding cavity 17. The forward hook 220 can define a recess 225, which can be a through-hole as shown. Likewise, the extension portion 210 and the forward hook 220 can define a recess 215, which can be a through-hole as shown. The recesses can, for example and without limitation, reduce the weight (and thus cost) of the cover fastening clip 100 and can facilitate manufacturing of the cover fastening clip 100 by reducing or eliminating thicker sections that may deform during the molding process and in particular during the cooling or curing process. As shown, the symmetrical placement of the pair of claws 240*a*, 240*b* with one claw on each side of the cover fastening clip 100 can be set to minimize the angle at which the wire 36 can twist inside the wire holding cavity 17. The shoulder 260 can extend from the locking part 110. The dimension of the shoulder 260 in the left-right direction is greater than the dimension of the wire holding cavity 17 of the hook 200 in the left-right direction. The dimension of the shoulder 260 is greater than the dimension of the locking part 110 in the left-right direction.

A method of using the cover fastening clip 100 is described with reference to FIG. 10. As shown, the cover fastening clip 100 can be used to stretch the cover 32 to a predetermined position of a surface of the cushion 30 for a cover fastening system 90, which can comprise part of a vehicle seat or other panel, only a small part of which is shown. The cushion 30 can be formed into a seat shape from a synthetic resin foam material such as foamed polyurethane. The cushion 30 can define the groove 34, and the wire 36 can be disposed in the groove 34. The wire 36 can be formed from any one a number of materials including, for example and without limitation, metal, and can be incorporated into the cushion 30 by a process such as, for example and without limitation, insert molding. In one aspect, the diameter D of the wire 36 can measure approximately 2.0 mm. In another aspect, the diameter D of the wire 36 can measure less than or greater than 2.0 mm and the dimensions of the cover fastening clip 100 can be adjusted accordingly to match.

The cover 32 can comprise at least one panel configured to cover the surface of the cushion 30. The cover 32 can be formed from a material such as, for example and without limitation, a synthetic resin, fabric, or leather. The cover 32 can comprise a seam portion 38 at a part corresponding to the groove 34 of the cushion 30. The seam portion 38 can be formed by mating and aligning edges of the pair of covers 32 to face each other and by sewing the same to a locking tape 40 with an overlapping joint. In one aspect, a side edge of the locking tape 40 opposite from the seam portion 38 can be integrally formed with the locking end member 42. In another aspect, the side edge of the locking tape 40 and the locking end member 42 can be formed separately and subsequently coupled to each other. The locking end member 42 can be formed from a material such as, for example and without limitation, a synthetic resin, can have a substantially V-shaped cross-section, and can be formed along a longitudinal direction of the locking tape 40. The locking end member 42 can be mounted to the locking tape 40 by insert-molding one side edge of the locking tape 40. The locking end member 42 can be sized to fit within the pair of locking claws 120,130 of the cover fastening clip 100 and can be equidistantly formed with locking grooves 44 along the longitudinal direction of the locking tape 40. The locking groove 44 can define a width and a depth within which the locking tab 160 of the cover fastening clip 100 can be inserted therein.

A method of using the cover fastening clip 100 can comprise laying the cover 32 over the cushion 30. The cover fastening clip 100 can first be attached to any desired position of the locking end member 42 of the locking tape 40, which is attached to the cover 32. A plurality of the cover fastening clips 100 can be attached equidistantly—or at any variable spacing as desired—along the longitudinal direction of the locking end member 42. Each of the plurality of the cover fastening clips 100 can be attached to the locking end member 42 by pushing the locking end member 42 in between the pair of locking claws 120,130 of each cover fastening clip 100. The pair of locking claws 120,130 can be made to elastically deform so that the locking end member 42 passes therethrough. When the locking end member 42 fully engages inside the locking part 110, the locking claws 120,130 can return to their original position. More specifically, the leading end portions 122,132 of the pair of locking claws 120,130 can cover a top portion of the locking end member 42 facing toward the seam portion 38, and the locking end member 42 can be secured between the pair of locking claws 120,130 and not be separated therefrom. The locking tabs 160,170 of the locking claws 120,130 can in the same process of assembly be received within the locking grooves 44 of the locking end member 42 and each of the plurality of the cover fastening clips 100 can thus be fixed or stopped at predetermined positions along the longitudinal direction of the locking end member 42.

The seam portion 38 of the cover 32, with the cover fastening clips 100 attached thereto, can be aligned with the groove 34 of the cushion 30. A hook 200 of the cover fastening clip 100 can be made to contact to the wire 36 and then pressed with an object such as, for example and without limitation, a finger or an installation tool (neither shown). Structures and methods for installing the cover fastening clip 100 as well as other information related to the cover fastening clip 100 are shown and described in U.S. Patent Publication No. 2016/0264030, published Sep. 15, 2016, which is hereby incorporated by reference in its entirety. The cover fastening clip 100 can be positioned so that the wire 36 is aligned with the wire insertion opening 27. When the cover fastening clip 100 is pushed against the wire 36, the wire 36 can be guided to the guide surfaces 22,23 of the wire insertion opening 27. When the cover fastening clip 100 is further pushed and inserted into the groove 34 of the cushion 30, the wire 36 can be positioned in the entrance passageway defined by the guide surfaces 22,23 facing towards the wire insertion opening 27 and can thereby be guided to the wire insertion opening 27.

The wire insertion opening 27 can be made smaller than the diameter D of the wire 36 so that the wire 36 cannot pass therethrough as-is. Rather, when the cover fastening clip 100 is pressed from above, the guide 300 can be made to elastically deform so that the wire insertion opening 27 becomes equal to or wider than the diameter D of the wire 36. Therefore, the wire 36 can be made to pass through the wire insertion opening 27 and enter the wire holding cavity 17. After the wire 36 enters the wire holding cavity 17, the elastically deformed guide 300 can return to its original shape and the wire insertion opening 27 can return to its narrow state and the wire 36 is thus prevented from being separated from the cover fastening clip 100. Thereby, the cover fastening clip 100 can be locked to the wire 36, and the cover 32 attached to the cover fastening clips 100 can be attached to the surface of the cushion 30, with the edge portion thereof being introduced in the groove 34.

Figure 11:
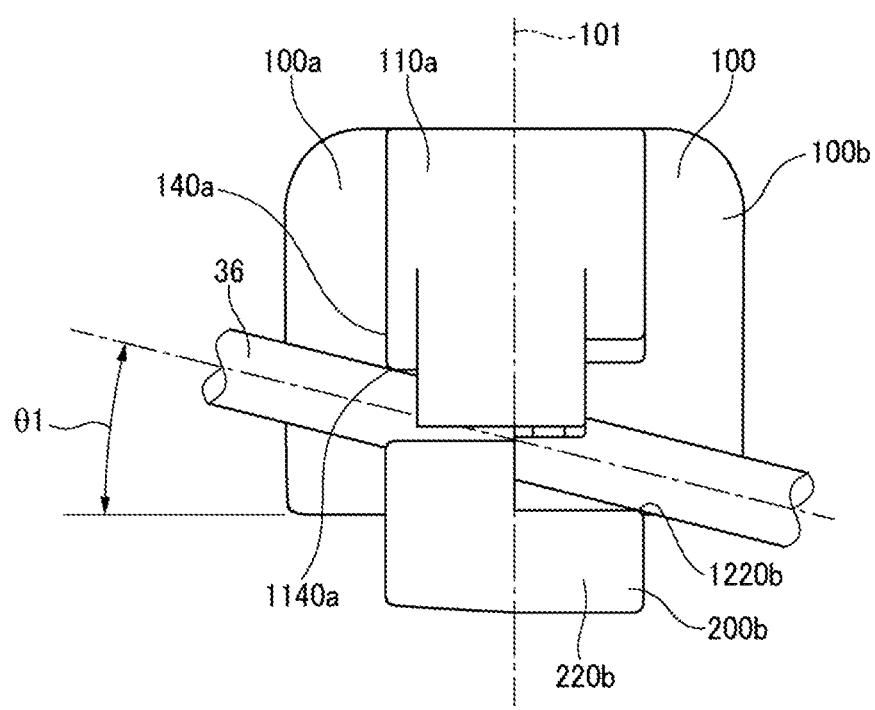
FIG. 11 is a front view of the cover fastening clip of FIG. 1 showing a wire engaged in the cover fastening clip in a twisted condition.
Figure 12:
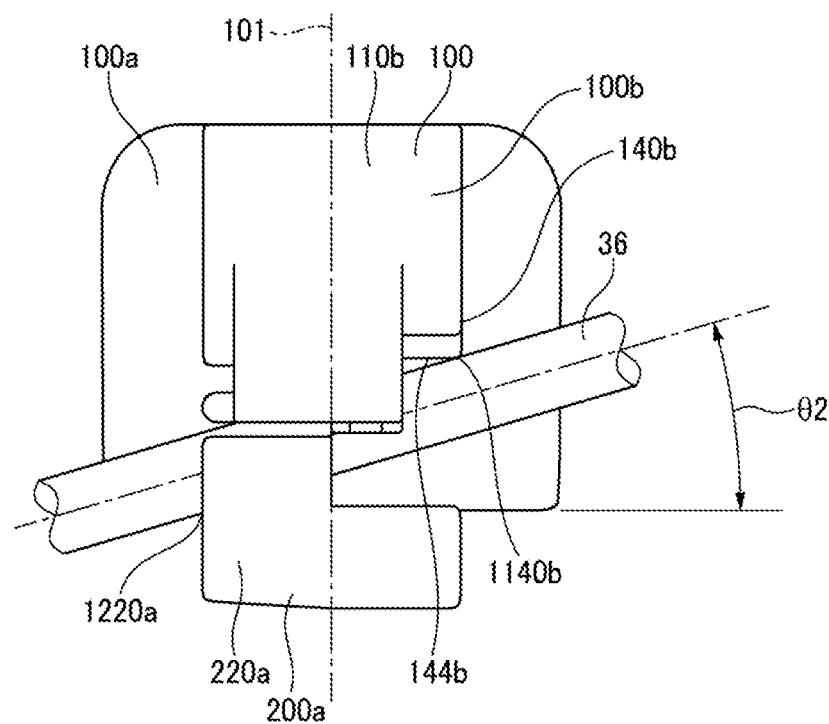
FIG. 12 is a front view of the cover fastening clip of FIG. 11 showing the wire of FIG. 11 engaged in the cover fastening clip in a different twisted condition than that shown in FIG. 11.

FIGS. 11-17 show the wire twisted and/or shifted in various ways inside the cover fastening clip 100. In FIG. 11 showing the front of the cover fastening clip 100, for example, rotation of the wire 36 past a maximum rotation angle $\Theta 1$ can be prevented by the presence of the edge 1140a of the lower surface 144a of the locking claw base part 140a of the locking part 110a on the left side 100a and the edge 1220b of the forward hook 220b of the hook 200b on the right side 100b. As shown in FIG. 12, rotation of the wire 36 past a maximum rotation angle $\Theta 2$ in the opposite direction as shown in FIG. 11 can be prevented by the presence of the edge 1140b of the lower surface 144b of the locking claw base part 140b of the locking part 110b on the right side 100b and the edge 1220a of the forward hook 220a of the hook 200a on the left side 100a.

Figure 13:
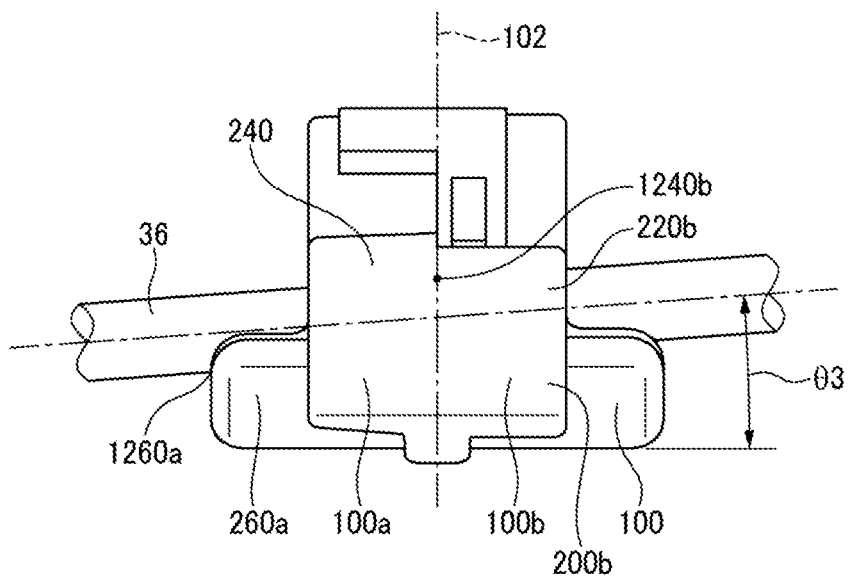
FIG. 13 is a bottom view of the cover fastening clip of FIG. 1 showing a wire engaged in the cover fastening clip in a twisted condition.
Figure 14:
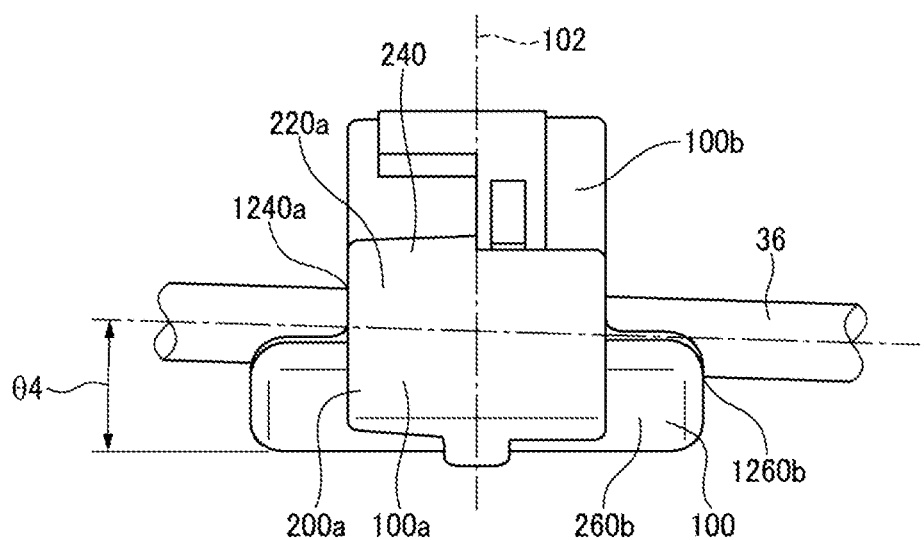
FIG. 14 is a bottom view of the cover fastening clip of FIG. 11 showing the wire of FIG. 13 engaged in the cover fastening clip in a different twisted condition than that shown in FIG. 13.

In FIG. 13 showing the bottom of the cover fastening clip 100, rotation of the wire 36 past a maximum rotation angle $\Theta 3$ can be prevented by the presence of the edge 1260a of the shoulder 260a on the left side 100a and the edge 1240b (hidden behind the claw 240 at it its intersection with the centerline axis 102) of the claw 240 of the forward hook 220b of the hook 200b on the left side 100b. As shown in FIG. 14, rotation of the wire 36 past a maximum rotation angle $\Theta 4$ in the opposite direction as shown in FIG. 13 can be prevented by the presence of the edge 1260b of the shoulder 260 on the right side 100b and the edge 1240a of the claw 240 of the forward hook 220a of the hook 200a on the left side 100a.

Figure 15:
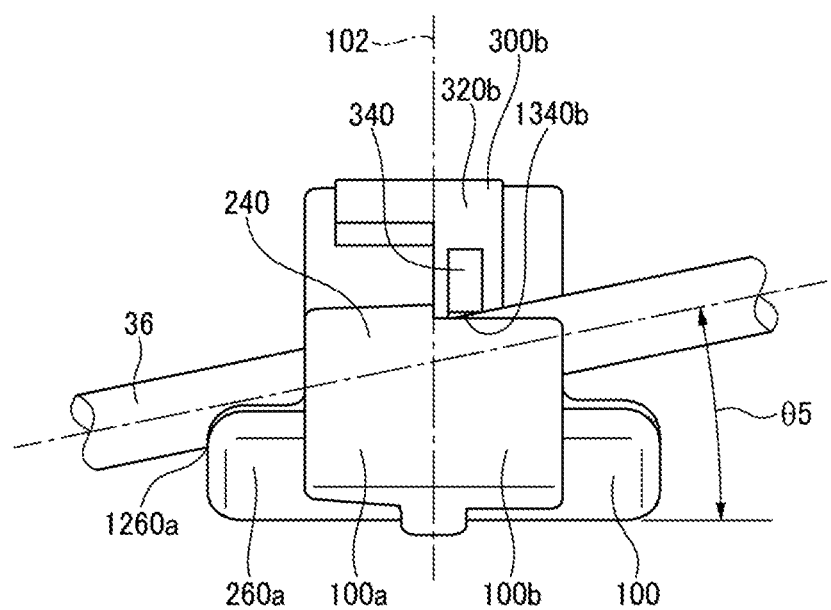
FIG. 15 is a bottom view of the cover fastening clip of FIG. 11 showing the wire of FIG. 13 engaged in the cover fastening clip in another different twisted condition than that shown in FIG. 13.
Figure 16:
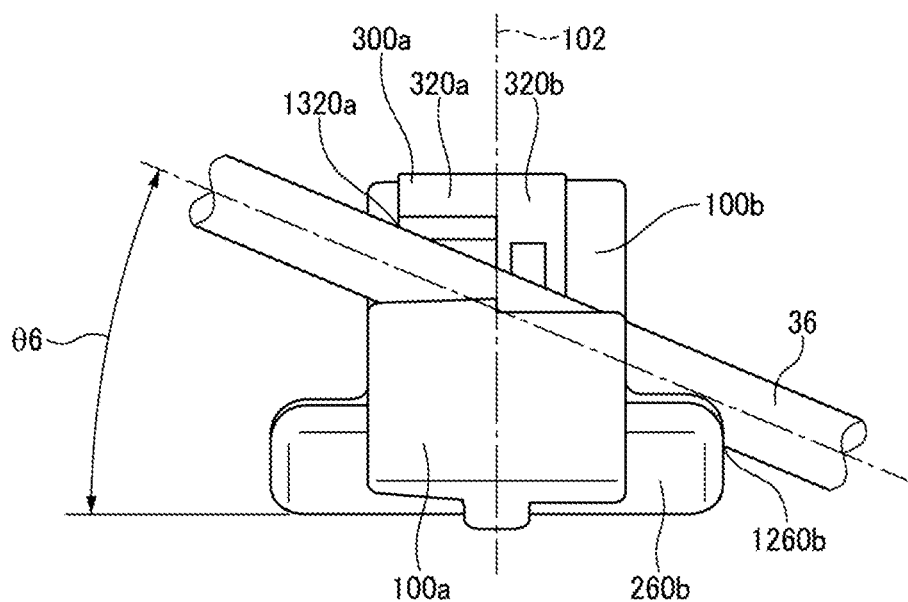
FIG. 16 is a bottom view of the cover fastening clip of FIG. 11 showing the wire of FIG. 14 engaged in the cover fastening clip in another different twisted condition than that shown in FIG. 14.

In FIG. 15 also showing the bottom of the cover fastening clip 100, rotation of the wire 36 past a maximum rotation angle $\Theta 5$ can be prevented by the presence of the edge 1260a of the shoulder 260a on the left side 100a and the edge 1340b of the ramp 340 of the second leg 320b of the guide 300b on the left side 100b. As shown in FIG. 16, rotation of the wire 36 past a maximum rotation angle $\Theta 6$ in the opposite direction as shown in FIG. 15 can be prevented by the presence of the edge 1260b of the shoulder 260 on the right side 100b and the edge 1320a of the second leg 320a of the guide 300a on the left side 100a.

Figure 17:
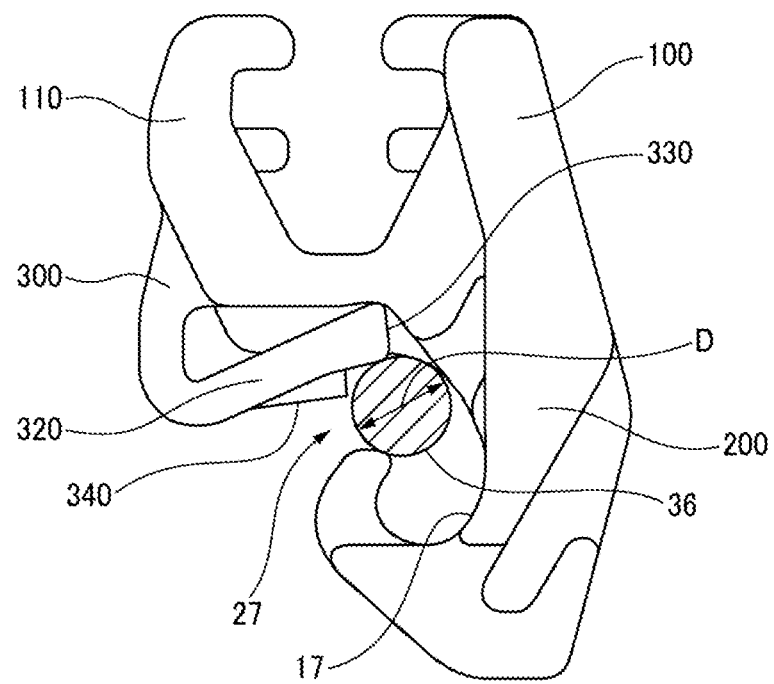
FIG. 17 is a right side elevation view of the cover fastening clip of FIG. 11 showing a wire engaged in the cover fastening clip in a twisted condition tending to open a guide of the cover fastening clip.

FIG. 17 shows the wire through a twisting or other motion reaching a portion of the wire holding cavity 17 that is immediately adjacent to the wire insertion opening 27. As shown, the ramp 340 and the tip 330 of the second leg 320 of the guide 300 block further movement of the wire 36 out of the wire holding cavity 17. While the wire as shown is aligned along the X-axis direction and further rotation of the wire 36 could cause the wire 36 to interact with different features of the cover fastening clip 100, the aforementioned features of the cover fastening clip 100 can be made to prevent rotation of the wire 36 to a point where the wire 36 could escape from the wire holding cavity 17. In one aspect, the maximum rotation angles $\Theta 1$, $\Theta 2$, $\Theta 3$, $\Theta 4$, $\Theta 5$, $\Theta 6$ can be maintained below 15 degrees. In another aspect, the maximum rotation angles $\Theta 1$, $\Theta 2$, $\Theta 3$, $\Theta 4$, $\Theta 5$, $\Theta 6$ can be maintained below 10 degrees. In another aspect, the maximum rotation angles $\Theta 1$, $\Theta 2$, $\Theta 3$, $\Theta 4$, $\Theta 5$, $\Theta 6$ can be maintained outside these value ranges without danger of the wire 36 escaping from the wire holding cavity 17. The examples provided are meant to demonstrate the effectiveness of the cover fastening clip 100 in a variety of conditions; however, rotation of the wire 36 in planes other than that shown can also be limited by the features incorporated into the cover fastening clip 100 described herein. Any of the aforementioned features of the cover fastening clip 100, including the shoulder 260, the first protrusion 150, the gusset 270, the second protrusion 280, or any portion of each, can be considered an anti-rotation feature.

Because the wire 36 can comprise curved and other non-straight sections and because the cover fastening clip 100 can be loaded from above through the cover 32 from a variety of directions in ways that might dislodge the cover fastening clip 100, it can be helpful for the cover fastening clip 100 to be held securely on the wire under as many conditions as possible. A secure connection of the cover fastening clip 100 to the wire 36 can also reduce or eliminate the risk of noise created when the wire 36 moves within or above the wire holding cavity 17 of the cover fastening clip 100 such as by external force.

Figure 18:
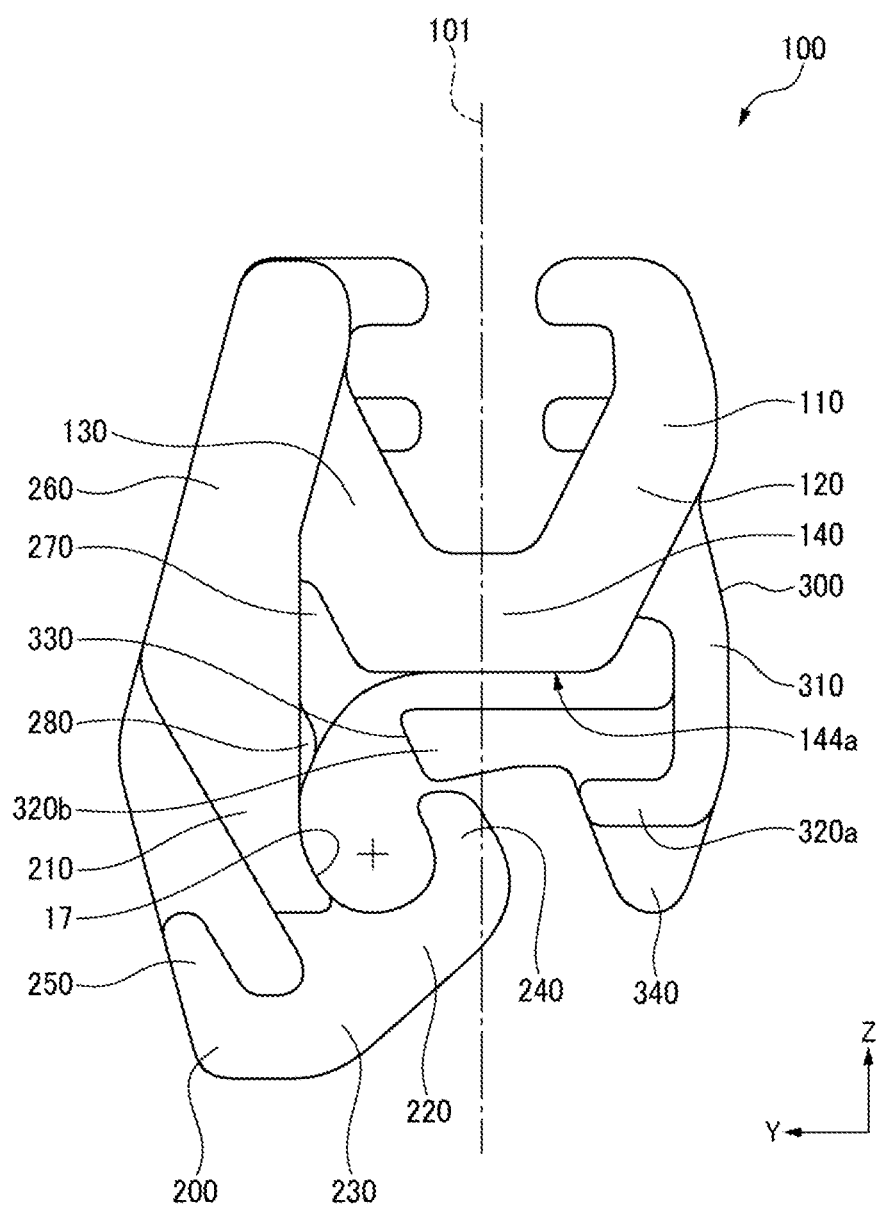
FIG. 18 is a left side view of a cover fastening clip of a modified example in accordance with one aspect of the current disclosure.

FIG. 18 shows a left side view of a cover fastening clip of a modified example in accordance with one aspect of the current disclosure. In the modified example, the second leg 320a on the left side is disposed so as to be offset downward relative to the second leg 320b on the right side, and the ramp 340 is formed so as to protrude downward beyond the lower surface of the second leg 320a on the left side. The ramp 340 is formed into a shape bulging downward, and is disposed on the lower surface of the second leg 320b on the right side as well as the above aspect. And, as well as the above aspect, the second leg 320a on the left side defines the edge 1320a and the ramp 340 defines the edge 1340b to function as an anti-rotation feature.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

DESCRIPTION OF REFERENCE NUMBERS

100: cover fastening clip
110: locking part
116: locking groove
120,130: locking claw
122,132: leading end portion
124,134: locking surface
126,136: inner surface
128,138: arm
140: locking claw base part
142: upper surface
144: lower surface
150: first protrusion
160,170: locking tab
200: hook
210: extension portion
215: recess
220: forward hook
225: recess
230: base
240: claw
250: reverse hook
256: rib
260: shoulder
270: gusset
280: second protrusion
290: offset distance
300: guide
305: connection portion
310: first leg
320: second leg
330: tip
340: ramp
17: wire holding cavity
22,23: guide surface
27: wire insertion opening
30: cushion
32: cover
34: groove
36: wire
42: locking end member
44: locking groove That which is claimed is:

1. A clip for attaching a seat cover to a seat cushion, the clip comprising:
   a locking part configured to be secured to the seat cover;
   a hook connected to the locking part and configured to be secured to a wire of the seat cushion, wherein the hook defines a wire holding cavity; and
   an anti-rotation feature, wherein a shoulder extends from the locking part and the hook such that a dimension of the shoulder in a left-right direction is greater than a dimension of the locking part in the left-right direction and is greater than a dimension of the hook in the left-right direction, wherein right and left side edges of the shoulder define the anti-rotation feature, wherein the anti-rotation feature also extends from the hook of the clip, wherein a dimension of the anti-rotation feature in the left-right direction is greater than a dimension of the wire holding cavity of the hook in the left-right direction, and wherein the left-right direction coincides with an extension direction of the wire when the wire is disposed inside the wire holding cavity of the clip.

2. The clip of claim 1,
   wherein the anti-rotation feature is configured to prevent rotation of the wire when disposed inside the wire holding cavity of the clip beyond about 10 degrees from an X-axis direction of the clip, which coincides with the left-right direction of the clip.

3. The clip of claim 1, further comprising a guide extending from the locking part,
wherein the guide comprises a first leg extending in a Z-axis direction of the clip and a second leg extending from the first leg,
wherein the Z-axis direction of the clip is perpendicular to an X-axis direction of the clip, which coincides with the left-right direction of the clip.

4. The clip of claim 1,
wherein the anti-rotation feature is formed at the position of the wire holding cavity of the hook.

5. The clip of claim 1, wherein the center of the wire holding cavity of the hook is offset from a first centerline axis of the locking part.

6. The clip of claim 1,
wherein a counterclockwise rotation of the wire when disposed inside the wire holding cavity of the clip with respect to the X-axis direction is prevented by the left side edge of the shoulder and a right side edge of the hook, and
wherein a clockwise rotation of the wire when disposed inside the wire holding cavity of the clip with respect to the X-axis direction is prevented by the right side edge of the shoulder and a left side edge of the hook.

7. A clip for attaching a seat cover to a seat cushion, the clip comprising:
a locking part configured to be secured to the seat cover;
a hook connected to the locking part and configured to be secured to a wire of the seat cushion, wherein the hook defines a wire holding cavity; and
an anti-rotation feature, wherein the anti-rotation feature extends from the locking part of the clip, wherein a dimension of the anti-rotation feature in a left-right direction is greater than a dimension of the locking part in the left-right direction, wherein the left-right direction coincides with an extension direction of the wire when the wire is disposed inside the wire holding cavity of the clip, wherein the anti-rotation feature is configured to prevent rotation of the wire when disposed inside the wire holding cavity of the clip beyond about 10 degrees from an X-axis direction of the clip, which coincides with the left-right direction.

8. A clip for attaching a seat cover to a seat cushion, the clip comprising:
a locking part configured to be secured to the seat cover;
a hook connected to the locking part and configured to be secured to a wire of the seat cushion, wherein the hook defines a wire holding cavity;
a guide extending from the locking part, wherein the guide comprises a first leg extending in a Z-axis direction of the clip and a second leg extending from the first leg, wherein the Z-axis direction of the clip is perpendicular to an X-axis direction of the clip, wherein the X-axis direction of the clip coincides with the extension direction of the wire when the wire is disposed inside the wire holding cavity of the clip, and wherein the second leg includes a left second leg and a right second leg; and
an anti-rotation feature extending from the hook of the clip, wherein a dimension of the first anti-rotation feature in a left-right direction is greater than a dimension of the wire holding cavity of the hook in the left-right direction, wherein the left-right direction coincides with the X-axis direction of the clip, wherein the anti-rotation feature is further provided on a lower surface of the right second leg.

9. A clip for attaching a seat cover to a seat cushion, the clip comprising:
a locking part configured to be secured to the seat cover;
a hook connected to the locking part and configured to be secured to a wire of the seat cushion, wherein the hook defines a wire holding cavity; and
an anti-rotation means for preventing rotation of a wire disposed inside the wire holding cavity of the clip beyond about 10 degrees from an X-axis direction of the clip,
wherein the X-axis direction of the clip coincides with an extension direction of the wire when the wire is disposed inside the wire holding cavity of the clip.

* * * * *